United States Patent [19]

Simms et al.

[11] 4,305,143

[45] Dec. 8, 1981

[54] AUTOMATIC MAN OVERBOARD SENSOR AND RESCUE SYSTEM

[76] Inventors: Larry L. Simms, P.O. Box 1083, San Pedro, Calif. 90733; Steve P. Moisen, 2227 S. Alma St., San Pedro, Calif. 90731; Norbert C. Cupp, 2805 E. Third St., Long Beach, Calif. 90814

[21] Appl. No.: 64,790

[22] Filed: Aug. 8, 1979

[51] Int. Cl.³ .......................................... H04B 11/00
[52] U.S. Cl. ........................................ 367/134; 9/14; 9/313; 340/573; 367/137; 367/133; 367/910
[58] Field of Search ............... 367/131, 134, 910, 137, 367/132, 133; 340/850, 573; 200/61.04, 61.08; 9/14, 313

[56] References Cited

U.S. PATENT DOCUMENTS

| | | | |
|---|---|---|---|
| 3,006,002 | 10/1961 | Pingree et al. | 367/4 |
| 3,469,231 | 9/1969 | Geiling et al. | 367/910 |
| 3,686,656 | 8/1972 | Richards | 200/61.04 |
| 3,786,406 | 1/1974 | Bianco | 367/134 |
| 3,798,692 | 3/1974 | Madeley | 9/313 |
| 3,801,759 | 4/1974 | Temple | 200/61.08 |
| 3,810,146 | 5/1974 | Lieb | 340/573 |
| 3,886,612 | 6/1975 | Schnirel et al. | 9/14 |
| 3,945,067 | 3/1976 | Salvarezza | 9/14 |
| 4,079,364 | 3/1978 | Antenore | 340/573 |

*Primary Examiner*—Richard A. Farley
*Attorney, Agent, or Firm*—Lewis B. Sternfels

[57] ABSTRACT

A system, which automatically or manually signals and senses the event of a person falling overboard from a vessel (12) into water (14), comprises a portable transmitter (16) coupled to a sound-producing transducer carried by the person (10) for transmitting ultrasonic and/or audible sound waves (18) through the water to a receiver (20) carried by the vessel. The receiver thereby permits rescue operations of the person to be initiated.

14 Claims, 7 Drawing Figures

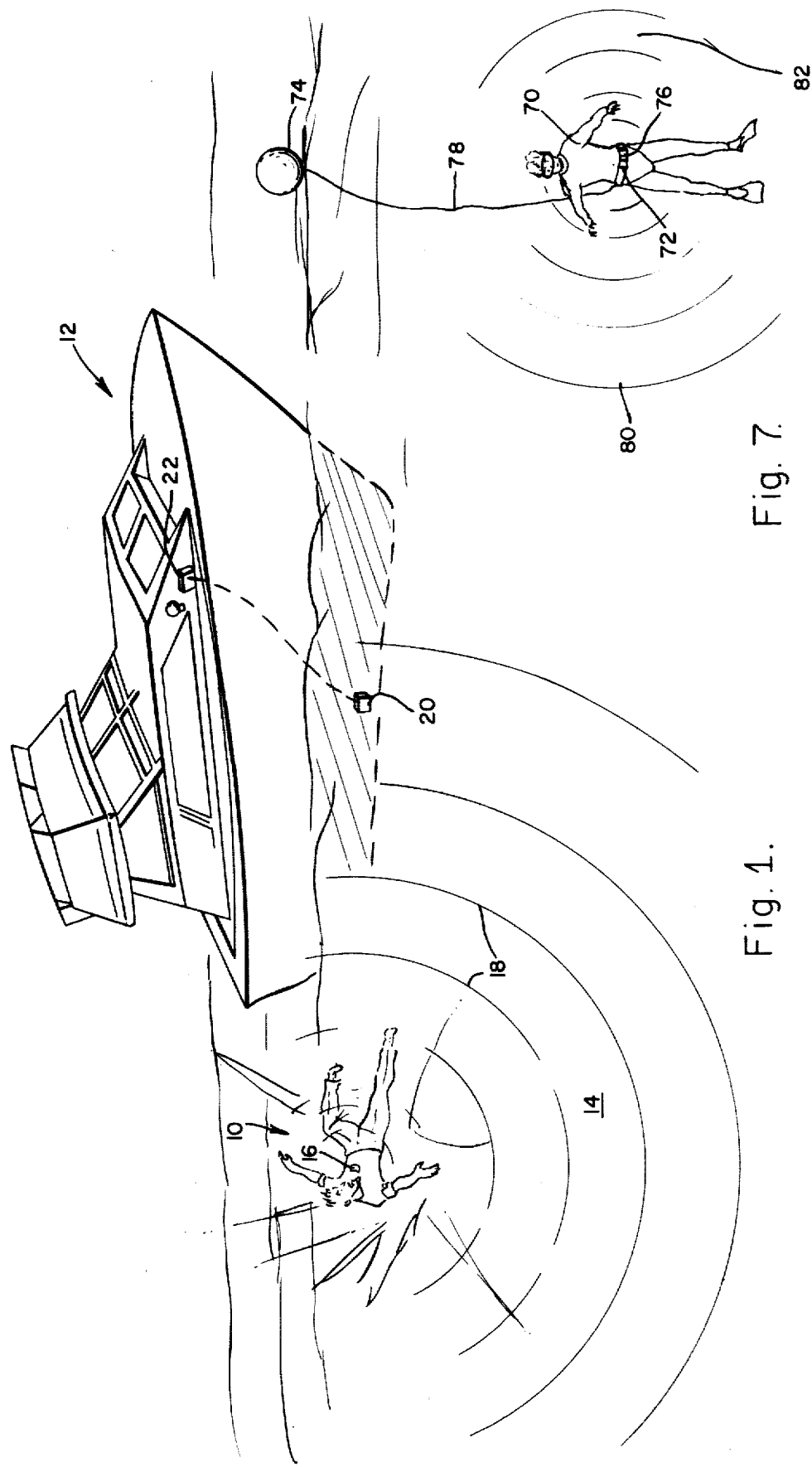

AUTOMATIC MAN OVERBOARD SENSOR AND RESCUE SYSTEM

TECHNICAL FIELD

The present invention relates to a system and method for automatically sensing and signalling the event of a person who has fallen overboard from a vessel into water and for enabling their rescue.

BACKGROUND ART

There is a need for improved systems for rescuing persons who have fallen overboard into water from a convoy or a merchant or pleasure ship or other vessel. Particular problems arise if the accident occurred at night, the weather were inclement, the seas were choppy, or the person were physically impaired or injured or lost consciousness in the fall, or the sole occupant of the vessel. The only known system includes the use of radio transmission from on or above the water, utilizing an antenna. The primary problem with such a radio transmission system is that submersion of the antenna in water can render it inoperative. Therefore, there is a requirement that there be some means, for even the person overboard somehow, to manipulate the transmitter device and hold it out of or above the water. This may not be possible if some of the above problems existed, e.g., inclement weather, choppy seas, and a physically impaired, injured or unconscious person. In addition, such radio transmission devices are relatively expensive as costing $100.00 or more, to permit their issuance for each person who may be on a vessel.

SUMMARY OF THE INVENTION

The present invention avoids and overcomes these and other problems by providing for an automatic signalling and sensing system and method which is activated when a person falls overboard from a vessel into water, by transmission of ultrasonic and/or audible sound waves through the water from the person at least to a receiver carried by the vessel in order to permit rescue operations to be initiated.

It is, therefore, an object of the present invention to provide for a personal rescuing method and system for persons having fallen overboard.

Another object is to provide for an automatically actuatable system and method which does not require any action by the person overboard.

Another object is to provide for a relatively inexpensive system and method which is economically feasible of issuance to each person aboard a vessel.

Another object is to enable use of the water to advantage in such rescue.

Another object is to provide for such a system and method whose signal is readily detectable from and not obscured by other ambient sea noises.

Another object is to provide for such a system and method which is capable of operating only when needed and which has safeguards from activation upon accidental or improper handling by pranksters and vandals.

Another object is to initiate rescue of incapacitated or trapped persons in the water.

Other aims and objects as well as a more complete understanding of the present invention will appear from the following explanation of an exemplary embodiment and accompanying drawings thereof.

BRIEF DESCRIPTION OF THE DRAWINGS

FIG. 1 is a view of the general setting in which use of the present invention is needed;

FIG. 7 is another embodiment of the invention designed for initiation of the rescue of incapacitated divers.

DETAILED DESCRIPTION OF THE INVENTION

Figure 3:
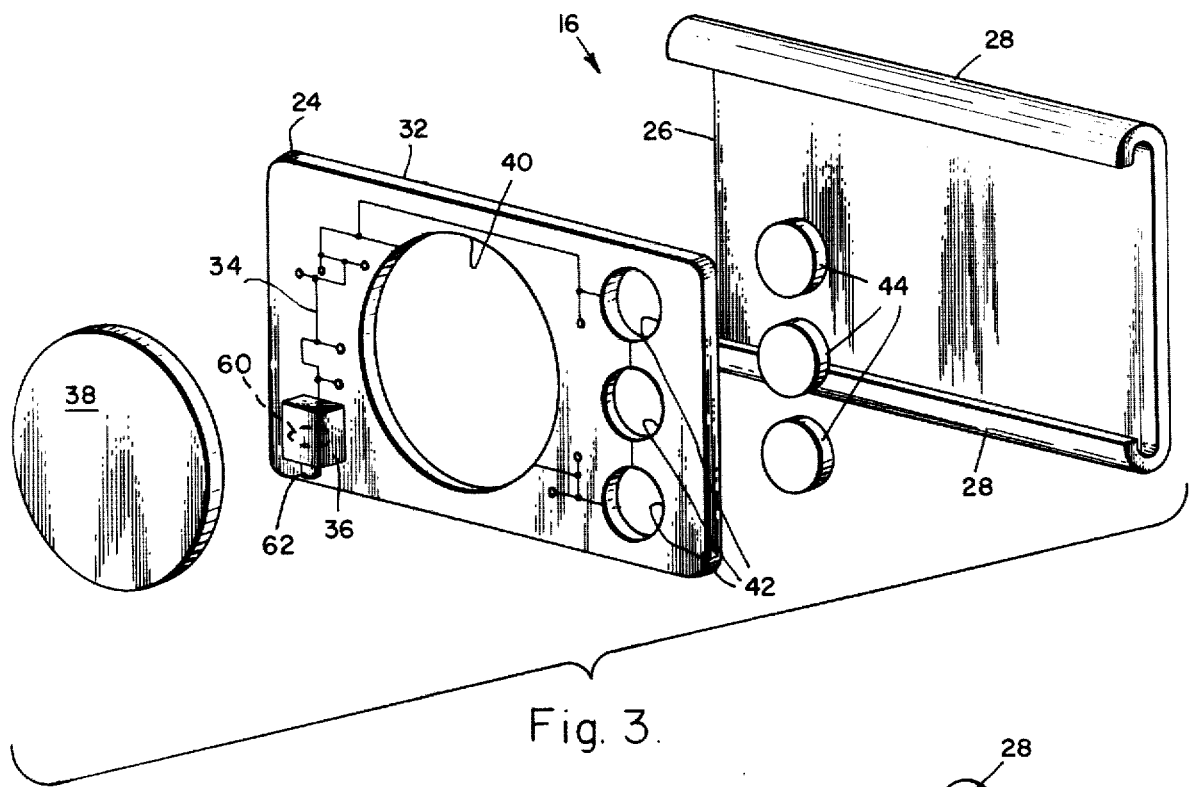
FIG. 3 is an exploded view of the invention shown in FIG. 2.

In FIG. 1, a person 10 is shown as having fallen overboard from a vessel 12 into water 14. In this event, the person is shown as having a portable transmitter unit 16, embodying the invention, which is attached to a name tag to his shirt. As will be more fully described, the attached unit transmits ultrasonic sound waves 18 through the water to a receiving unit 20 carried by the vessel for actuating a rescue-initiating mechanism 22. Mechanism 22 may comprise any number of alarm devices such as an audible alarm or a remote display. It may also actuate such life-saving devices as a flotation device and a marker buoy including a strobe light. It may additionally operate to turn the engine off or to steer the vessel in a desired path. All such life-saving devices are well-known, and therefore, are not illustrated.

Figure 2:
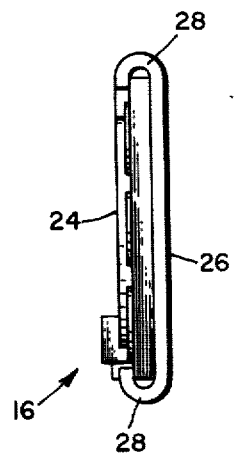
FIG. 2 is an end view of the present invention placed in a holder for enabling the inventive sensor to be attached to a person.
Figure 4:
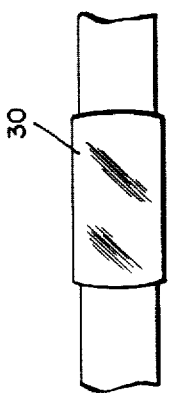
FIGS. 4 and 5 illustrate respective name tag and belt methods of attachment of the invention to the person.
Figure 5:
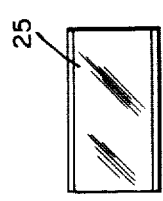

As shown in FIGS. 2 and 3, unit 16 includes a transmitter portion 24 carried within a sleeve 26 whose top and bottom portions 28 are curved around to resiliently press against transmitter portion 24. Such a unit may be carried by means of a name tag 25, which is shown in FIG. 4, with a pin for attachment to the wearer's outer garment. Alternatively, as shown in FIG. 5, unit 16 may be embodied within a buckle 30 to be worn as part of a belt. Other means of attachment will be suggested depending on the attachment needs.

As shown in FIG. 3, transmitter portion 24 comprises a printed circuitboard 32 having desired circuitry 34 leading from, for example, a hydrostatic switch 36 to a transducer 38, fittable within an opening 40 in the printed circuitboard. Openings 42 are also provided in the circuitboard for reception of batteries 44.

Figure 6:
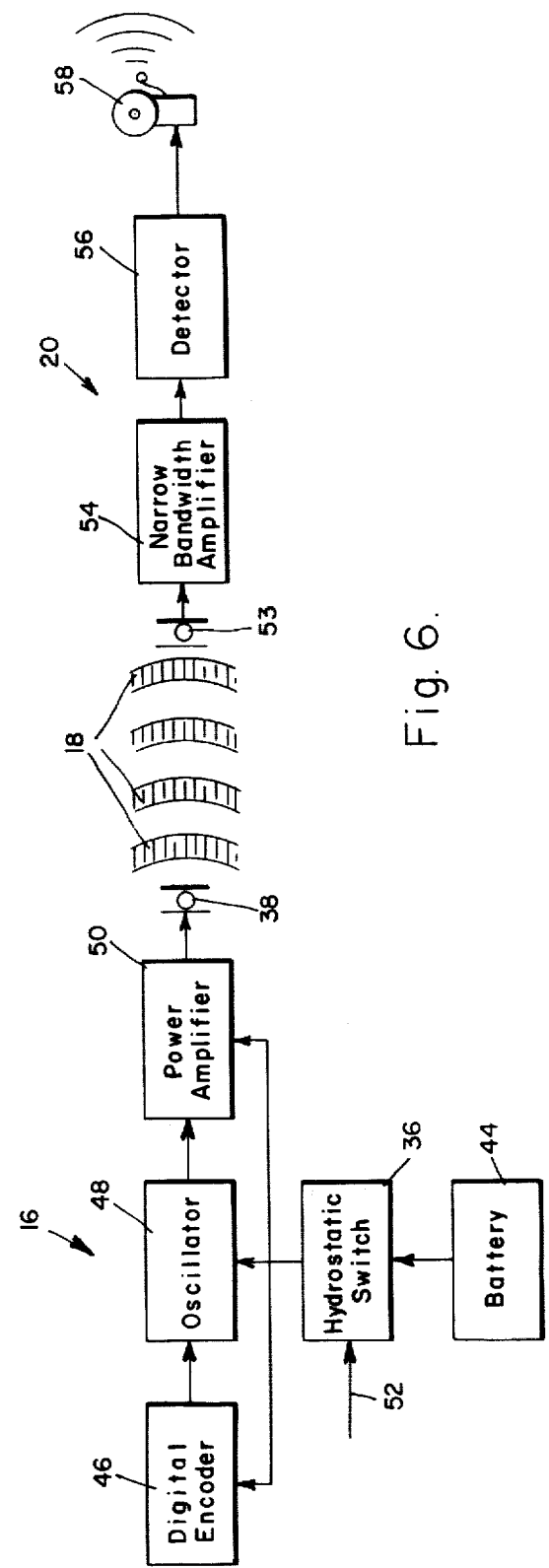
FIG. 6 is a block diagram of the various components of the invention.

The transmitter portion as well as the receiving apparatus are shown in greater detail in FIG. 6. Briefly, transmitter unit 16 comprises a digital encoder 46 (if desired), an oscillator 48, and a power amplifier 50, all connected in series and all connected to battery power supply 44 through hydrostatic switch 36. Upon actuation of hydrostatic switch 36 by the pressure of water, as denoted by arrow 52, transmitter unit 16 is enabled to cause transmission by transducer 38 to produce ultrasonic sound waves 18 which are transmitted through the water to receiver unit 20. Receiver 20 includes a receiving transducer 53, a narrow bandwidth amplifier 54, a detector 56, all coupled in series, for operating an alarm 58. Although shown as an alarm, substitutions or additional equipment may be added thereto, such as the above-mentioned selection of life-saving devices, apparatus to stop the engine of the vessel, and the like.

Specifically, transducers 38 and 53 may comprise any convenient material, the preferred including a disc of barium titanate, lead titanate, or lead zirconate. Such a transducer is obtainable as Model Channel 5400 made by Channel Industries, Inc., of Santa Barbara, Calif. Such a disc has a preferred frequency constant of 78 kc/in working in a planar or thickness extensional mode. Such a device is capable of operating in the preferred frequency range of 60 and 100 kHz. This frequency range is chosen because the ambient noise in the sea and moving vessels are at a minimum between these frequencies. Other frequencies may be used if desired and may be necessary in order to prevent interference with any frequency already used by the vessel.

The selection of the particular transducer geometry is dependent upon various factors. The most important is that the frequency range is selected where the moving ship's noise is at a minimum. Based upon naval studies, such vessel noises fall off above approximately 50 kHz. Another important factor relates to the radiation pattern of the signal. Both the frequency and the radiation pattern in part are determined by the size of the transducer. As the transducer becomes smaller, its frequency of resonance increases but, with an increase in frequency, the radiation pattern becomes correspondingly narrow. In the use of the present invention, it is preferred to have an omnidirectional pattern for the reason that, when a person falls overboard from a vessel, the person's movement will cause corresponding movement of the transducer. It is not possible under ordinary circumstances for the person to direct the transmitter toward the vessel. Therefore, an omnidirectional pattern at a lesser frequency is preferred. Based upon these considerations, the size limitations of the transducer involves some tradeoff between frequency and radiation pattern. Generally, the upper limit is 100 kHz at which point the radiation pattern becomes more directional than preferred. It is to be understood, of course, that if necessity so dictates, higher frequencies may be utilized. Accordingly, the preferred frequency range, based upon the above factors, is between 60 and 100 kHz.

Power amplifier 50 is selected to have an impedance which matches that of the transducer and needs only to provide a greater power output than available from oscillator 48 to overcome any interference, noise, or attenuation.

Oscillator 48 is designed to create a sinusoidal waveform at the chosen frequency. Such a frequency could be chosen for use in notifying a group of vessels in the same geographical area as the person having fallen overboard. Such a commonly received frequency would also halp other vessels from hitting the person overboard as well as to aid in the rescue operation.

Digital encoder 46 is used only if there were a need to identify one or more individuals. Such identification might be necessary if the identified person had certain health, age and other problems. In addition, if the overboard condition were caused by vandals or pranksters, identification might be of aid in determining who the culprit might be.

Each battery in power supply 44 should have a long shelf life, a flat discharge characteristic, and a low internal impedance because the aim and requirement of the battery is to be useful after a long-term storage and to provide a rapid, fast discharge in a period of approximately 1 minute to fully expend the charge of the battery. Mercury or lithium batteries are suitable for these purposes. The power rating of the battery is, of necessity, associated with the power amplifier, which drives the transducer with approximately 10–15 watts of power.

Switch 36 is preferred to be of a hydrostatic type so that it may be initiated by fresh or salt water pressure and is designed to prevent pranksters and vandals from throwing unit 16 into the water and, therefore, from falsely sounding the alarm. Thus, it is required that the unit have a positive buoyancy where the switch will not be closed, but will respond to a specific pressure exerted by a depth of water where the switch can be closed. Such buoyancy may be obtained by fabricating the housing or unit enclosure of a high density foam material, e.g., urethane foam of 7 pounds per cubic foot density. As shown in FIG. 3, the hydrostatic switch includes a diaphragm 60 which is open at one side to water pressure through an orifice 62. By imparting a buoyancy to unit 16, it is not possible to develop the required water pressure to be exerted upon diaphragm 60, unless the transmitter unit were attached to a person. At that point, the unit would be sufficiently submerged to permit a larger pressure to move the diaphragm into a switch-closing position.

Once the transmitter unit is actuated, it is desired that it latch to remain transmitting so that, when a person is flailing and thrashing around in the water, the transmitter will not switch on and off but will remain on. This may be achieved in several ways such as by permanently deforming the diaphragm by the exerted pressure, or by coating a pair of switch surfaces with electrically conductive adhesive so that, when contact is made therebetween, they adhere together.

Another desired requirement is that there be delay of about 1 second before the transmitter is activated and latched, again to avoid problems relating to pranksterism and vandalism. This requirement is achieved by restricting the orifice at 62 through which the water enters. A further method of achieving latching and delay is to utilize a silicon controlled recitifier and capacitor which are associated with gate circuitry.

As stated above, the ultrasonic sound waves are received by receiver 20 and its transducer 53 whose requirements are the same as transmitting transducer 38.

Amplifier 54 is preferably of a narrow band type to exclude noise and signals of other frequencies and to prevent spurious alarms. Thus, reception of a weak signal is optimized.

Detector 56 causes a switch to close upon receipt of a signal from amplifier 54 and causes a relay to close and to actuate alarm 58, to eject life-saving devices, to stop the engines, etc. It may be desirable to provide a very brief delay, e.g., 250 milliseconds, in the actuation of the relay by means of an appropriate RC network. Such a delay will prevent spurious actuation of the alarm device due to impulse noises normally occurring in the sea. Detector 56, amplifier 54 and transducer 20 may be prepared from a standard semiconductor chip, such as obtained from National Semiconductor, chip No. LM1812.

A decoder may be incorporated at the receiving end to decode any digital information developed by encoder 46 to identify the particular party in the water.

The signal from detector 56 may also be used to stop the engine of the vessel, especially if it is a one-man boat. It is also possible to use the signal to prevent the boat from moving away from the person having fallen into the water.

It is also desirable to have the receiver latch on upon receipt of the signal and to provide a manual reset for the receiver.

Referring now to FIG. 7, a diver 70, particularly a SCUBA diver, is shown to be in need of rescue while underwater. Rescue may be initiated by means of a device 72, which is similar to that previously described. Specifically, device 70 differs from portable transmitter unit 16 in that it utilizes a manually actuable switch instead of hydrostatic switch 36. Additionally, a marker buoy exemplified as a balloon 74 is inflated by actuation of the manually operated switch acting on a compressed gas cartridge 76 incorporated in unit 70. Marker buoy 74 may also comprise a flare, smoke or dye. Since a cord 78 secures marker 74 to the diver, he can be readily located by his rescuers. As before, notice of his dilemma is transmitted to a vessel, such as vessel 12 of FIG. 1, by ultrasonic waves 80 and, if desired, audible signals 82 may also be initiated for transmission directly to neighboring divers.

Although the invention has been described with reference to a particular embodiment thereof, it should be realized that various changes and modifications may be made therein without departing from the spirit and scope of the invention.

I claim:

1. A system for automatically signalling the event of a person falling overboard from a vessel into water comprising:
   a portable transmitter included within a waterproof package which is floatable in water and carried by the person for generating and automatically transmitting alarm actuating sonic waveforms through the water;
   a receiver carried by the vessel for receiving the sonic waveforms;
   means coupled to said receiver and actuated thereby for causing immediate rescue operations of the person to be expedited; and
   pressure-sensitive means coupled to said transmitter for actuating said transmitter upon immersion of said pressure-sensitive means in the water and comprising a hydrostatic switch having an initiating mechanism which is responsive to a specific pressure of the water established by the depth of its immersion in the water, said initiating mechanism being nonresponsive when said transmitter package is substantially at the surface of the water.

2. A system according to claim 1 wherein said initiating mechanism comprises a restricting orifice open to the water and communicating with a switch-operating diaphragm.

3. A system according to claim 1 further comprising a battery, coupled to said pressure-sensitive means, having a generally flat discharge characteristic and low internal impedance to provide a rapid discharge to said transmitter.

4. A system according to claim 1 wherein said transmitter is sized to operate at a frequency between 60 kHz and 100 kHz.

5. A system according to claim 1 wherein said rescue causing means comprises an alarm.

6. A system according to claim 1 wherein the sonic waveforms fall within the ultrasonic and/or audible frequency ranges.

7. A system according to claim 1 wherein said rescue causing means comprises an ejection of life-saving devices to the person fallen overboard.

8. A system according to claim 1 wherein said rescue causing means comprises a stopping of the vessel's engines.

9. A system for automatically signalling the event of a person falling overboard from a vessel into water comprising:
   a portable transmitter carried by the person for generating and automatically transmitting alarm actuating sonic waveforms through the water;
   a receiver carried by the vessel for receiving the sonic waveforms;
   means coupled to said receiver and actuated thereby for causing immediate rescue operations of the person to be expedited;
   pressure-sensitive means coupled to said transmitter for actuating said transmitter upon immersion of said pressure-sensitive means in the water and comprising a hydrostatic switch having an initiating mechanism which is responsive to a specific pressure of the water established by the depth of its immersion in the water, said initiating mechanism comprising a restricting orifice open to the water and communicating with a switch-operating diaphragm; and
   a latching device coupled to said initiating mechanism and said switch for maintaining said switch closed once it has been closed by the water pressure.

10. A system according to claims 1 or 9 wherein said rescue causing means includes marker means on said vessel and deployed upon receipt of the sonic waveforms for visually marking the person's location.

11. A system according to claim 10 wherein said marker means comprises an inflatable balloon.

12. A system according to claim 10 wherein said marker means comprises a flare.

13. A system according to claim 10 wherein said marker means comprises smoke.

14. A system according to claim 10 wherein said marker means comprises dye.

* * * * *